(12) United States Patent
Siebert et al.

(10) Patent No.: US 9,090,801 B2
(45) Date of Patent: Jul. 28, 2015

(54) ADHESIVE TAPE WITH TEXTILE CARRIER FOR CABLE BANDAGING

(75) Inventors: Michael Siebert, Schenefeld (DE); Andreas Wahlers-Schmidlin, Guderhandviertel (DE); Dennis Seitzer, Hamburg (DE); Daniel Wienke, Hamburg (DE)

(73) Assignee: tesa SE, Hamburg (DE)

( * ) Notice: Subject to any disclaimer, the term of this patent is extended or adjusted under 35 U.S.C. 154(b) by 112 days.

(21) Appl. No.: 13/409,829

(22) Filed: Mar. 1, 2012

(65) Prior Publication Data

US 2012/0227894 A1    Sep. 13, 2012

(30) Foreign Application Priority Data

Mar. 7, 2011 (DE) .................. 10 2011 005 163

(51) Int. Cl.
| | |
|---|---|
| B32B 37/12 | (2006.01) |
| B32B 27/12 | (2006.01) |
| B32B 5/02 | (2006.01) |
| D04H 1/00 | (2006.01) |
| C09J 7/04 | (2006.01) |
| D04H 1/52 | (2006.01) |
| B32B 3/00 | (2006.01) |
| D03D 13/00 | (2006.01) |

(52) U.S. Cl.
CPC ... *C09J 7/04* (2013.01); *D04H 1/52* (2013.01); *C09J 2201/622* (2013.01); *C09J 2203/302* (2013.01); *C09J 2400/263* (2013.01); *C09J 2407/00* (2013.01); *C09J 2433/00* (2013.01); *C09J 2483/00* (2013.01)

(58) Field of Classification Search
None
See application file for complete search history.

(56) References Cited

U.S. PATENT DOCUMENTS

| 6,016,845 | A * | 1/2000 | Quigley et al. ............... 138/125 |
| 6,432,529 | B1 | 8/2002 | Harder et al. |
| 7,199,065 | B1 * | 4/2007 | Groh et al. .................... 442/402 |
| 2002/0125037 | A1 | 9/2002 | Kulper et al. |
| 2003/0068945 | A1 | 4/2003 | Samson-Himmelstjerna |
| 2003/0198806 | A1 | 10/2003 | Samson-Himmelstjerna et al. |
| 2005/0115664 | A1 | 6/2005 | Musahl et al. |

(Continued)

FOREIGN PATENT DOCUMENTS

| CN | 101586008 A | 11/2009 |
| DE | 2330805 A1 | 1/1974 |

(Continued)

OTHER PUBLICATIONS

German Search Report dated Nov. 7, 2011.

(Continued)

*Primary Examiner* — Holly Le
*Assistant Examiner* — Thomas Mangohig
(74) *Attorney, Agent, or Firm* — Norris McLaughlin & Marcus, P.A.

(57) ABSTRACT

An adhesive tape having a carrier and an adhesive layer applied to at least one side of the carrier, wherein the carrier is a thread-stitched web nonwoven carrier produced from a preconsolidated base web of staple fibers. Mutually parallel threads are stitched into the base web to form the final thread-stitched web nonwoven carrier, wherein the ultimate tensile strength of the preconsolidated but not as yet overstitched base web is less than 2 N/cm. In embodiments, the ultimate tensile strength of the preconsolidated but not as yet overstitched base web is below 1 N/cm or below 0.5 N/cm.

20 Claims, 7 Drawing Sheets

(56) References Cited

U.S. PATENT DOCUMENTS

| | | |
|---|---|---|
| 2006/0231192 A1 * | 10/2006 | Wahlers-Schmidlin et al. ............................ 156/184 |
| 2009/0291303 A1 | 11/2009 | Kopf et al. |
| 2011/0070393 A1 * | 3/2011 | Kopf et al. .................... 428/68 |

FOREIGN PATENT DOCUMENTS

| | | |
|---|---|---|
| DE | 43 13 008 C1 | 11/1994 |
| DE | 44 42 507 A1 | 6/1996 |
| DE | 198 07 752 A1 | 8/1999 |
| DE | 100 11 788 A1 | 3/2002 |
| DE | 102 29 527 A1 | 1/2004 |
| DE | 103 29 994 A1 | 1/2005 |
| DE | 102006006405 A1 * | 8/2007 |
| DE | 202006018283 U1 | 4/2008 |
| DE | 202008013541 U1 | 1/2009 |
| DE | 10 2008 028427 A1 | 11/2009 |
| EP | 0 578 151 A1 | 1/1994 |
| EP | 0 668 336 A1 | 8/1995 |
| EP | 1 300 452 A1 | 4/2003 |
| EP | 1 312 097 A1 | 5/2003 |
| EP | 1 315 781 A1 | 6/2003 |
| EP | 1 367 608 A2 | 12/2003 |
| EP | 2128212 A2 | 11/2009 |
| WO | 2006/108871 A1 | 10/2006 |

OTHER PUBLICATIONS

Chinese Office Action for corresponding Chinese Application 201210057839.X dated Sep. 10, 2014.

* cited by examiner

ADHESIVE TAPE WITH TEXTILE CARRIER FOR CABLE BANDAGING

The invention relates to an adhesive tape preferably for sheathing elongate material such as more particularly lines or cable looms, having a textile carrier and having a preferably pressure-sensitive adhesive coating on at least one side of the carrier. The invention further relates to the use of the adhesive tape and also to an elongate material, such as a cable harness, which is jacketed with the adhesive tape of the invention, and to the textile carrier itself.

There are many industries where bundles of a multiplicity of electrical lines are wrapped either before installation, or when already mounted, in order to reduce the space requirements of the bundle of lines by bandaging, and also to obtain a protective function. Film-backed adhesive tapes provide a certain degree of protection against ingress of liquid; adhesive tapes based on thick nonwovens or foams as carriers provide damping properties; and abrasion-resistant, stable carrier materials provide protection against scuffing and rubbing.

The use of adhesive tapes comprising a fibrous nonwoven web carrier to bandage cable harnesses is known. DE 94 01 037 U and EP 0 668 336 A1 describe an adhesive tape having a tape-shaped textile carrier consisting of a stitch-bonded web nonwoven comprising a multiplicity of mutually parallel stitched seams. When the adhesive tape described is used for cable harness bandaging, it displays noise-damping properties due to its specific execution. Stitch-bonding machines of the Maliwatt type from Karl Mayer, formerly Malimo, are known and in use for this type of nonwoven. Its production involves a base web being produced from cross-laid staple fibres and being fed—without further preconsolidation—to the stitching station where the threads which form a mutually parallel arrangement in the machine direction are stitched in to consolidate the fibres. Cross-laid means that the fibres form an angle of preferably 90° relative to an axis extending exactly in the machine direction of the web.

The direction of flow of material into the machine producing a nonwoven fabric is known as the machine direction, while the direction at right angles thereto is correspondingly known as the cross direction.

In addition to the stitch-bonded web nonwoven mentioned in the cited reference there are further carriers used in adhesive tapes for cable harness bandaging.

DE 44 42 093 C1 discloses the use of an adhesive tape carrier nonwoven fabric formed as cross-laid fibrous web reinforced by the formation of meshes from the fibres of the web, i.e. a nonwoven fabric known to a person skilled in the art by the name of Malifleece. DE 44 42 507 C1 discloses a cable bandaging adhesive tape based on so-called Kunit or Multiknit webs.

DE 10 2008 028 427 A1 discloses an adhesive tape for jacketing cable looms which has a nonwoven-based carrier having an adhesive coating on at least one side and having a basis weight of 30 to 120 $g/m^2$.

The carrier consists of at least one layer of a preconsolidated web, especially a spunbonded web, a meltblown web or a mechanically (via air and/or water jets or by needling) consolidated staple fibre web, that is overstitched with a multiplicity of threads which, in a preferred embodiment, form a parallel arrangement in the machine direction.

When adhesive tapes coated with an adhesive on one side are pulled off the roll, the pulled-off adhesive tape between the hand and the roll may curve up between the longitudinal edges to form a semi-cylinder such that the side coated with adhesive is on the outer surface of the semi-cylinder. This effect is known as nipping.

In extreme cases, the adhesive tape may even curl up completely, so that the two longitudinal edges of the adhesive tape touch. Viewed in cross section, a closed circle is formed.

The faster the unwinding speed of the adhesive tape, the greater the degree of nipping which occurs.

First, nipping depends appreciably on the unwinding force.

The unwinding force is the force needed to pull a layer of the adhesive tape from the other layer in the roll. The unwinding force depends inter alia strongly on the winding tension used to produce the rolls and can increase during the storage of adhesive-tape rolls.

This means that, in the manufacturing operation of an adhesive tape, the add-on of adhesive and the subsequent winding operation are not freely chooseable if a fit-for-purpose adhesive tape is to be obtained.

It follows that only a very narrow processing window is available for the winding operation, between sufficient roll strength (high winding tensions) and low unwinding force if low nipping (low winding tensions) is to be achieved.

Secondly, nipping in the case of nonwoven carriers comprising webs overstitched with threads is greatly dependent on the number of threads used to overstitch the web.

A tearing strength in the transverse direction of less than 10 N, as determined to AFERA standard 4007, serves as criterion for the hand tearability of the tape.

Especially adhesive tapes with a thread-stitched web nonwoven carrier (Maliwatt carrier; see DIN 61211:2005-05 from May 2005) suffer from a distinct reduction in hand tearability on excessive consolidation.

On the other hand, if not adequately consolidated by stitching threads, these adhesive tapes tend to unwind with fibres being pulled out of the layer underneath, which reduce the adhesive power of the adhesive tape and impair the appearance of the adhesive tape. The unwinding force needed for the adhesive tape increases as a result; fibres have become adhered.

The known adhesive tapes with thread-stitched web nonwoven carriers have the evident disadvantage that, although mechanically sufficiently stable, they display nipping and fibre pull-out on unwinding, nor is the unwinding force in the optimum range.

The problem addressed by the present invention is that of achieving a marked improvement over the prior art and of providing an adhesive tape and also a textile carrier which are mechanically stable, have a distinctly reduced fibre pull-out or no nipping and which, on the other hand, are very efficiently hand-tearable.

This problem is solved by an adhesive tape as more particularly characterized in the main claim. Advantageous embodiments of the invention are described in the dependent claims. The concept of the invention further encompasses the use of the tape according to the invention, a cable harness jacketed with the tape and also a textile carrier.

The invention accordingly provides an adhesive tape consisting of a carrier and of an adhesive layer applied to at least one side of the carrier, wherein the carrier is a thread-stitched web nonwoven carrier produced from a preconsolidated base web of staple fibres, wherein the mutually parallel threads are stitched into the base web to form the final thread-stitched web nonwoven carrier, wherein the ultimate tensile strength of the preconsolidated but not as yet overstitched base web is less than 2 N/cm, preferably below 1 N/cm and more preferably below 0.5 N/cm.

Staple fibres are individual fibres of finite length. Filaments (infinitely long fibres) are the opposite of staple fibres. All natural fibres are staple fibres, for they only occur up to a certain length. All manufactured fibres can be cut into staple fibres. In what follows, staple fibres are also referred to as just fibres for simplicity.

According to the present invention, the version of the adhesive tape which has adhesive on one side only is preferred.

Preferably, the web consists of polyester, polypropylene, polyethylene or polyamide fibres.

Fibre thickness is preferably in the range from 1 to 5 dtex (1 tex: 1 gram per 1000 meters) and preferably in the range from 1.7 to 3.64 dtex.

Fibre length is preferably in the range from 50 to 100 mm and more preferably in the range from 60 to 85 mm.

It is further preferable for the stitching threads to consist of polyester, polypropylene, polyethylene or polyamide.

The stitching thread can be applied in a pillar stitch or in a tricot stitch. Thread thickness is preferably in the range from 20 to 70 dtex.

In a further preferred embodiment of the invention, the basis weight of the thread-stitched web nonwoven carrier is between 30 g/m$^2$ and 180 g/m$^2$.

In a further preferred embodiment of the invention, the preconsolidating of the staple fibre web before stitching is effected via needling, wherein the needling density is advantageously in the range from 1 needle/cm$^2$ of staple fibre web to 50 needles/cm$^2$ of staple fibre web.

In addition, the number of overstitching threads per 25 mm can be reduced by preconsolidating the foundational web to below the value of 30 threads/25 mm width of carrier without fibres being pulled out from the reverse side as the adhesive tape unwinds. The number of threads is preferably between 10 to 24 threads/25 mm width of carrier and more preferably equal to 22 threads/25 mm.

The thread-stitched web nonwoven carrier of the present invention is obtainable in a two-stage process by overstitching the preconsolidated web in a separate step.

The thread-stitched web nonwoven carrier of the present invention is also obtainable in a one-stage process by overstitching the preconsolidated web in-line.

Furthermore, the nonwoven carrier may be calendered to cause the web to become compacted, which can have a positive effect on the uniformity of the web and the needed add-on of adhesive. Calendering is to be understood as meaning compressing the web between two rolls under pressure and possibly elevated temperature.

For an adhesive tape of the present invention to have efficient hand-tearability, the angle α of at least 50% of the fibres should be between 10° and 45° (fibre laydown twisted relative to the cross direction), so that it is predominantly not the web fibres which have to tear but the warp thread. This is the case when the fibres are ideally lying along the tearing direction.

As mentioned, a tearing strength in the cross direction of less than 10 N, determined to AFERA standard 4007, serves as criterion for tape hand tearability.

Figure 3:
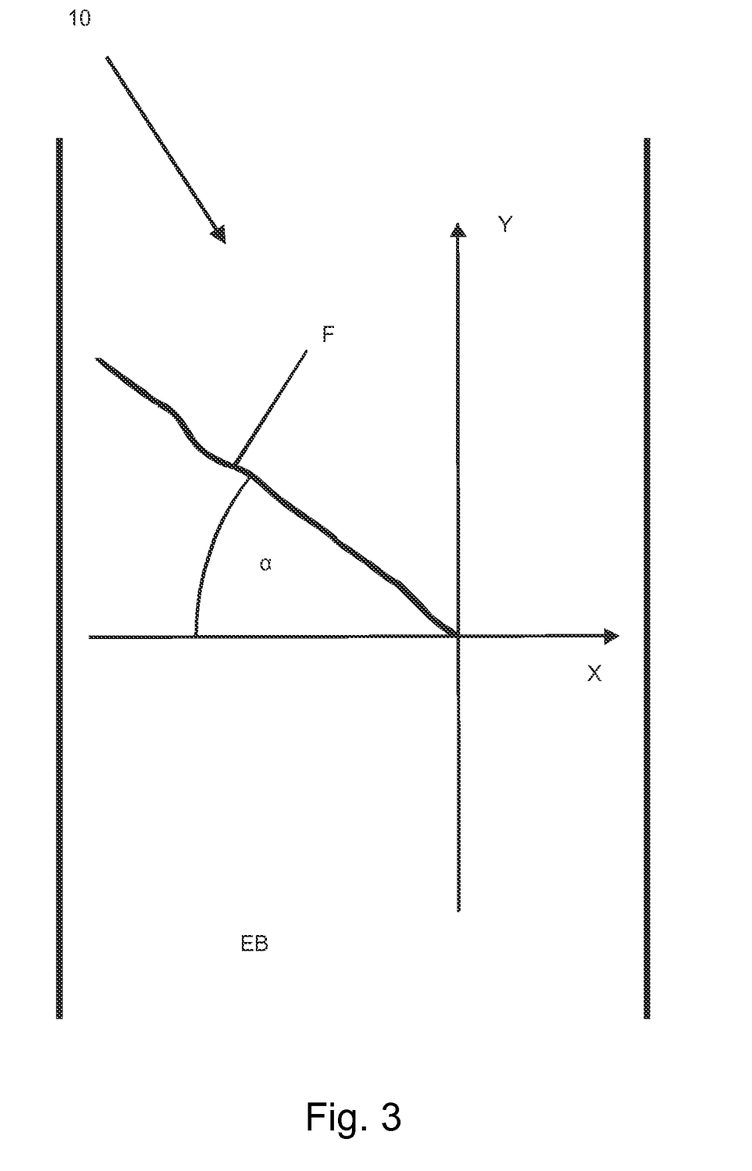
FIG. 3 shows an angle of a fibre positioned in a nonwoven carrier.

FIG. 3 shows how the angle α shall be determined in the case of a fibre F positioned in the nonwoven carrier 10. Ideally, the fibre F has the shape of a straight line and lies exactly in the plane EB formed by the axis Y in the machine direction and by the axis X in the cross direction, which are at a right angle relative to each other. In the event that the fibre F has approximately the shape of a straight line, the angle α is still determinable with reference to the fibre F itself. This is shown in FIG. 3.

The sheet of paper on which FIG. 3 is depicted is a cutout from the plane EB.

Figure 4:
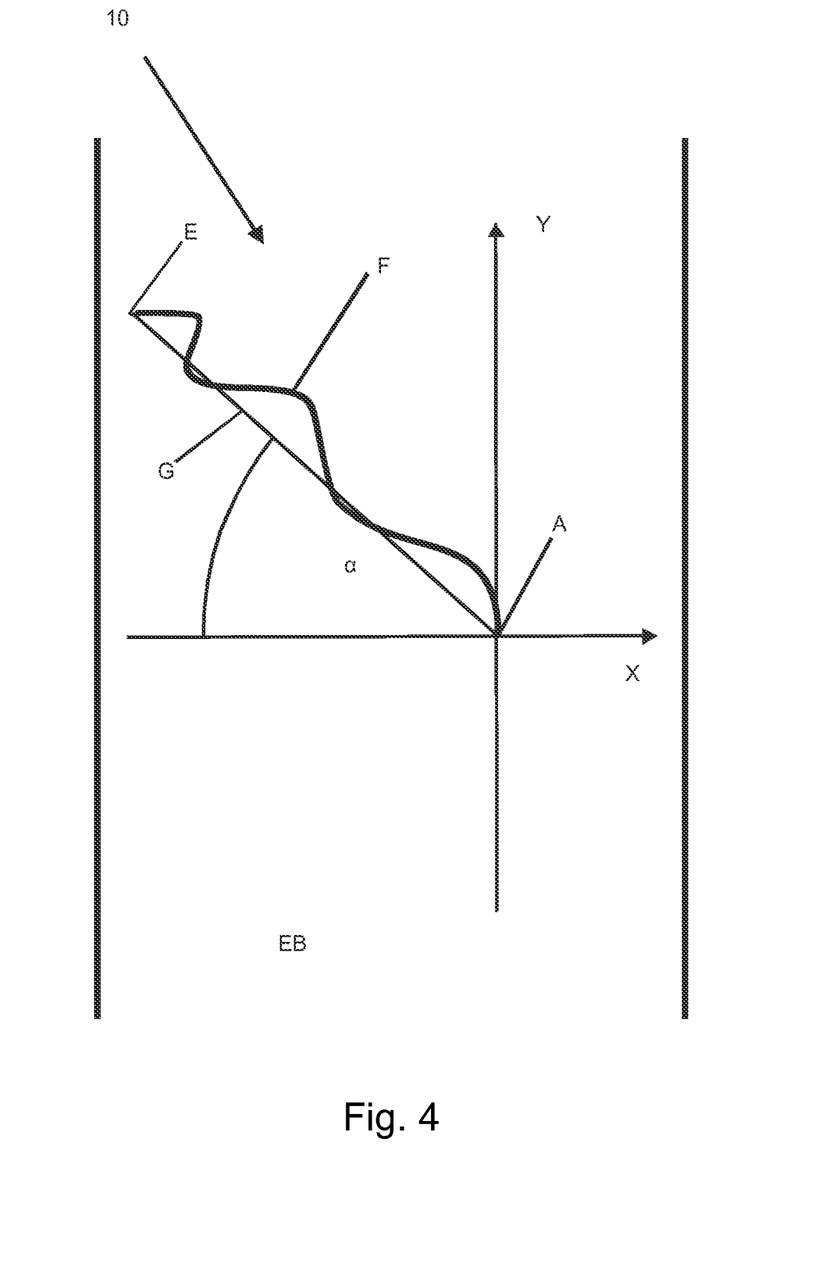
FIG. 4 shows an angle of a fibre, in a form other than that of a straight line, positioned in a nonwoven carrier.

In the event that the fibre F is not in the form of a straight line, but in a form other than that of a straight line, for example in the form with slight waves which is depicted in FIG. 4, the angle α is determined by placing a straight line G between the starting point A and the end point E of the fibre F, so that the angle α is the angle α between the axis X, which extends in the cross direction of the web, and the straight line G.

This leaves out of consideration those very few fibres which form a closed circle.

Figure 5:
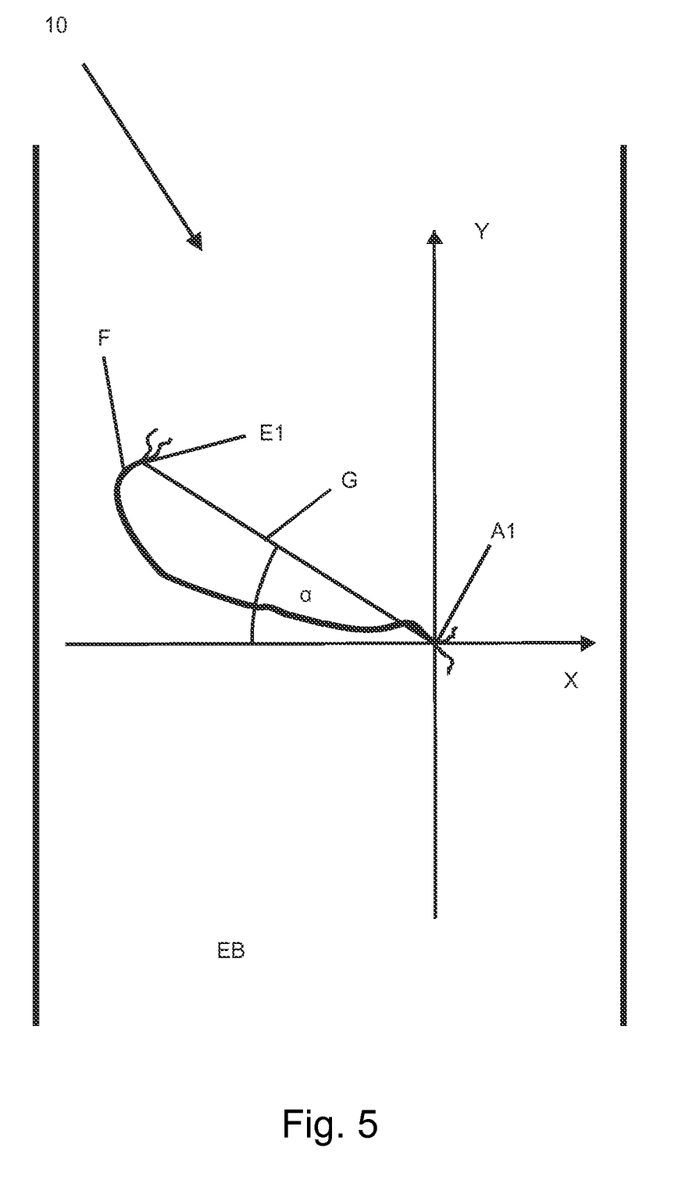
FIG. 5 shows an angle of a fibre, split at both ends, positioned in a nonwoven carrier.

When the fibre F is split at one end or even at both ends, the straight line G is placed between the point A1 and E1 which form those points on the fibre F at which the split initiates in each case (see FIG. 5).

Figure 6:
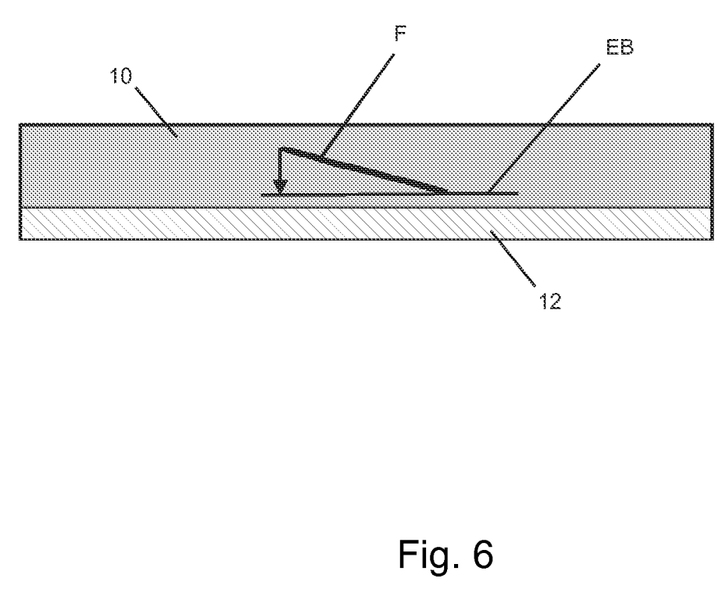
FIG. 6 shows a fibre extending to some extent through a thickness of a nonwoven carrier.
Figure 7:
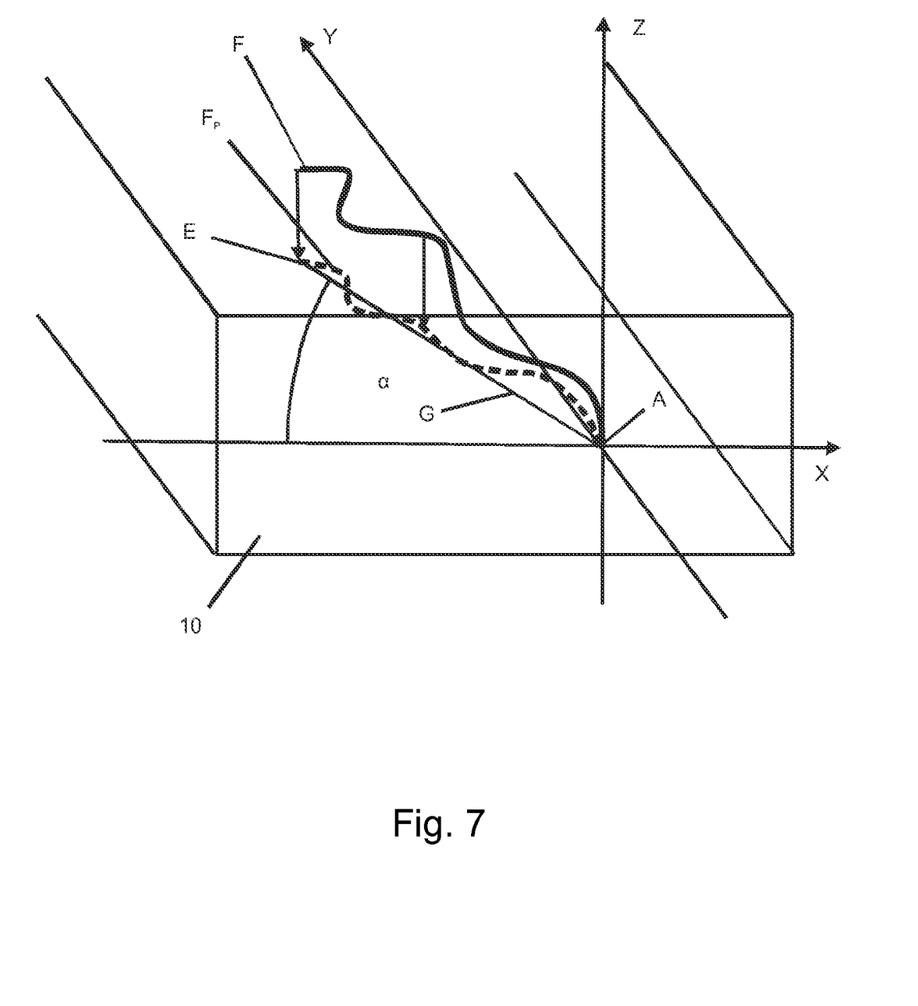
FIG. 7 shows an angle of a fibre extending to some extent through a thickness of a nonwoven carrier and positioned in the nonwoven carrier.

In the event that the fibre F does not lie exactly in the plane EB formed by the axis Y in the machine direction and the axis X in the cross direction, but also extends to some extent through the thickness of the web (i.e. in the z-direction), then the fibre F is initially projected perpendicularly onto the plane EB, leading to the virtual fibre $F_P$ in the plane EB. Then, the starting point A and the end point E of the fibre $F_P$ are connected together via the straight line G and the angle α is determined accordingly (see FIGS. 6 and 7).

In one preferred embodiment, the angle α made by at least 50% of the fibres relative to an axis extending exactly in the transverse direction of the web is between 5° and 45° and preferably between 15° and 30°.

Further preferably, the proportion of fibres forming an angle α between 5° and 45° and preferably between 15° and 30° relative to an axis extending exactly in the machine direction of the web is above 80%, preferably above 90% and more preferably above 95%.

At the same time, the needle density should be below 50 needles/cm$^2$, since every needling point renders the orientation of the fibres isotropic. If the number of needling points is too high, the preferential orientation in the cross direction, achieved by the cross-laying, is distinctly reduced or even completely eliminated.

To convert the carrier into an adhesive tape, any known adhesive system can be employed. In addition to natural or synthetic rubber-based adhesives it is possible more particularly to use silicone adhesives and also polyacrylate adhesives, preferably a low molecular weight acrylate pressure-sensitive hotmelt adhesive. On account of their particular usefulness as adhesives for wrapping tapes for automotive cable looms in respect of the absence of fogging and also the outstanding compatibility with both PVC and PVC-free core insulations, solvent-free acrylate hotmelt compositions as more particularly described in DE 198 07 752 A1 and also DE 100 11 788 A1 are preferable.

The add-on weight is preferably in the range between 15 to 200 g/m$^2$, more preferably in the range from 30 to 120 g/m$^2$ (roughly corresponding to a thickness of 15 to 200 μm and more preferably of 30 to 120 μm).

The adhesive is preferably a pressure-sensitive adhesive, i.e. an adhesive which provides a durable bond to almost all substrates under relatively light pressure and can be redetached from the substrate after use essentially without leaving a residue. A pressure-sensitive adhesive is permanently tacky at room temperature, i.e. has a sufficiently low viscosity and a high initial tack, so that it will wet the surface of the particular substrate under minimal pressure. The adherability of the adhesive material rests on its adhesive properties and the redetachability on its cohesive properties.

One suitable adhesive is based on an acrylate hotmelt with a K value of at least 20 and more particularly greater than 30 (measured in each case in 1% strength by weight solution in toluene, 25° C.), obtainable by concentrating a solution of such a composition to give a system which can be processed as a hot melt.

The K value (after FIKENTSCHER) is a measure of the average molecular size of high polymers. The viscosity of polymers is determined using a capillary viscometer in accordance with DIN EN ISO 1628-1:2009.

The measurement is carried out by preparing one-percent (1 g/100 ml) polymer solutions at 25° C. in toluene and measuring these using the corresponding DIN Ubbelohde viscometer according to ISO 3105:1994 Table B.9.

The concentrating can take place in appropriately equipped tanks or extruders, particularly in the case of the attendant devolatilization the preference is for a devolatilizing extruder.

An adhesive of this type is set forth in DE 43 13 008 C2. In an intermediate step, the solvent is completely removed from the acrylate compositions prepared in this way.

In addition, further volatile constituents are removed in the process. After coating from the melt, these compositions have only small residual fractions of volatile constituents. Accordingly it is possible to adopt all the monomers/recipes that are claimed in the patent cited above.

The solution of the composition can contain 5% to 80% by weight and more particularly 30% to 70% by weight of solvent.

Commercially available solvents are preferred, more particularly low-boiling hydrocarbons, ketones, alcohols and/or esters.

Preference is further given to single-screw, twin-screw or multi-screw extruders having one or, more particularly, two or more devolatilizing units.

The acrylate hotmelt-based adhesive may have had benzoin derivatives incorporated into it by copolymerization—for example benzoin acrylate or benzoin methacrylate, acrylic or methacrylic esters. Such benzoin derivatives are described in EP 0 578 151 A.

The acrylate hotmelt-based adhesive may be UV-crosslinked. Other types of crosslinking are also possible, however, electron-beam crosslinking being one example.

In a further preferred embodiment, self-adhesive compositions are used comprising copolymers of (meth)acrylic acid and esters thereof having 1 to 25 carbon atoms, maleic, fumaric and/or itaconic acid and/or esters thereof, substituted (meth)acrylamides, maleic anhydride and other vinyl compounds, such as vinyl esters, especially vinyl acetate, vinyl alcohols and/or vinyl ethers.

The residual solvent content should be below 1% by weight.

One adhesive which will be found to be particularly suitable is an acrylate pressure-sensitive hotmelt adhesive of the kind marketed by BASF under the name acResin, especially acResin A 260 UV. This adhesive, which has a low K value, acquires its use-appropriate properties via a final radiation-induced crosslinking operation.

The adhesive may be applied in the longitudinal direction of the adhesive tape, in the form of a stripe having a width less than that of the adhesive tape carrier.

In one advantageous embodiment, the coated stripe has a width amounting to 10 to 80% of the width of the carrier material. The use of stripes having a coating of 20 to 50% of the width of the carrier material is particularly preferable.

Depending on the use scenario it is also possible for two or more parallel stripes of adhesive to be coated on the carrier material.

The position of the stripe on the carrier is freely chooseable, although a disposition directly at one of the edges of the carrier is preferable.

The adhesives can be prepared and processed from solution, from dispersion and also from the melt. Preferred production and processing processes take place from the solution and also from the melt. Particular preference is given to fabricating the adhesive from the melt, in which case it is more particularly possible to use batch processes or continuous processes. The continuous fabrication of pressure-sensitive adhesives using an extruder is particularly advantageous.

The adhesives thus prepared can then be applied to the carrier using the generally known processes. In the case of processing from the melt, these can be application processes via a nozzle or a calender.

In the case of processes from solution, coatings with rods, blades or nozzles are known, to name but a few.

It is also possible to transfer the adhesive from a non-stick backing cloth or release liner onto the carrier assembly.

Finally, the adhesive tape may include a covering material to cover the one or two adhesive layers until use. Useful covering materials also include any of the materials recited at length above.

Preference, however, is given to a non-linting material such as a polymeric film or a highly sized long-fibred paper.

When low flammability is desired for the adhesive tape described, flame retardants can be added to the carrier and/or the adhesive. They can be organobromine compounds, if necessary together with synergists such as antimony trioxide, although with an eye to the absence of halogen from the adhesive tape, preference will be given to using red phosphorus, organophosphorus compounds, mineral or intumescent compounds, such as ammonium polyphosphate alone or combined with synergists.

The general expression "adhesive tape" for the purpose of this invention encompasses all sheetlike structures such as two-dimensionally extended films or film portions, tapes of extended length and limited width, tape portions and the like, and lastly also diecuts or labels.

The adhesive tape may be produced not only in the form of a roll, i.e. self-wound up in the form of an Archimedean spiral, but also lined on the adhesive side with release materials such as siliconized paper or siliconized film.

The reverse face of the adhesive tape may be coated with a reverse-face lacquer in order that a favourable influence may be exerted on the unwind properties of the adhesive tape wound to an Archimedean spiral. For this purpose, this reverse-face lacquer may be coated with silicone or fluorosilicone compounds and also with polyvinylstearylcarbamate, polyethyleneiminestearylcarbamide or organofluorine compounds as adhesive substances. Optionally under the reverse-face lacquer or alternatively thereto, a foam coating is positioned on the reverse face of the adhesive tape.

The adhesive tape is preferably used for jacketing elongate material such as more particularly cable looms, the elongate material being enveloped by the adhesive tape in an axial direction, or the adhesive tape being passed in a helical spiral around the elongate material.

Finally, the concept of the invention also embraces an elongate material jacketed with an adhesive tape of the present invention. The elongate material is preferably a cable loom.

It surprisingly transpires that the nipping effect can be reduced by looping points appearing additionally to the stitching thread.

This observation is not possible in the case of a conventional thread-stitched web nonwoven carrier since by the very nature of the process there is no preconsolidation of the web.

Surprisingly, minimal preconsolidation of the carrier is sufficient to ameliorate the nipping effect without any significant adverse effect on hand tearability.

In addition, supplementary looping points enable minimization of fibre pull-out. Therefore, compared with thread-stitched web nonwoven carriers there is no need for the fibres in the carrier to be consolidated by the adhesive; and secondly, a significantly wider processing window is gained with regard to setting the unwinding force via the winding tension in the production of narrow rolls. In the case of narrow rolls having a width of 9 mm for example, longer fibres turn out to become severed on cutting and hence can no longer stabilize the nonwoven assembly. In the case of high winding tensions, then, fibres are increasingly pulled out as the adhesive tape unwinds, which leads to an increase in unwinding force and ultimately a reduction in adhesive power, since the adhesive material is contaminated by the fibres.

Owing to the outstanding suitability of the adhesive tape, it can be used in a jacketing which consists of a covering where the self-adhesive tape is present in an edge region of the covering at least and is adhered on the covering such that the adhesive tape extends beyond one of the longitudinal edges of the covering, preferably in a narrow edge region compared with the width of the covering.

Such a product and also optimized embodiments thereof are disclosed in EP 1 312 097 A1. EP 1 300 452 A2, DE 102 29 527 A1 and also WO 2006 108 871 A1 set forth further developments for which the adhesive tape of the present invention is likewise very highly suitable. The adhesive tape of the present invention can similarly be used in the process as disclosed in EP 1 367 608 A2.

Finally, EP 1 315 781 A1 and also DE 103 29 994 A1 describe embodiments of adhesive tapes as also possible for the adhesive tape of the present invention.

The invention further includes a thread-stitched web nonwoven carrier produced from a base web of staple fibres, wherein the mutually parallel threads are stitched into the preconsolidated base web to form the final thread-stitched web nonwoven carrier, wherein the ultimate tensile strength of the preconsolidated but not as yet overstitched base web is less than 2 N/cm, preferably below 1 N/cm and more preferably below 0.5 N/cm.

The thread-stitched web nonwoven carrier can have all the advantageous properties as described in this disclosure for the thread-stitched web nonwoven carrier which according to the invention is used as adhesive tape carrier.

The adhesive tape will now be more particularly elucidated using several figures without any intention thereby to cause any kind of restriction.

Figure 1:
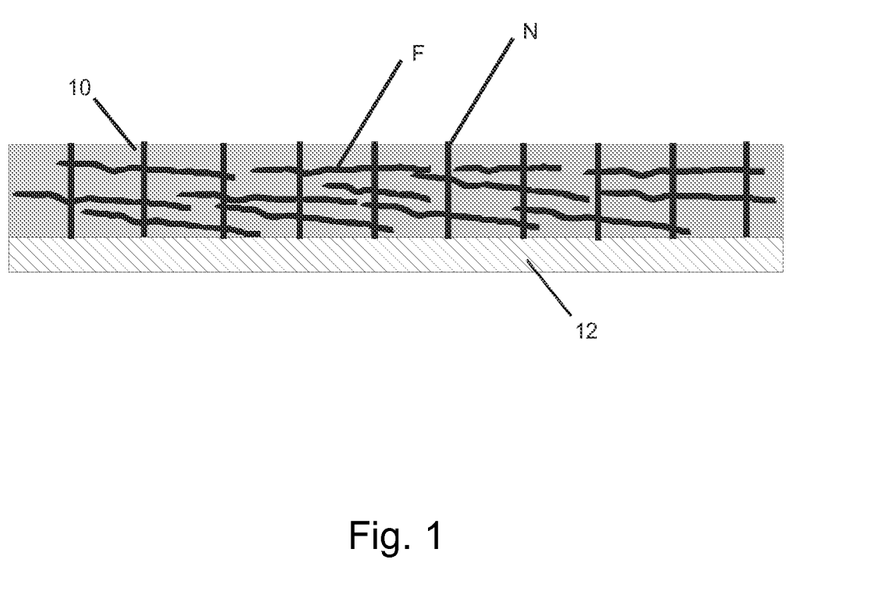
FIG. 1 shows the adhesive tape in lateral section.

FIG. 1 shows a section in the cross direction (cross section) of the adhesive tape which consists of a thread-stitched web nonwoven carrier 10 coated on one side with a layer of a self-adhesive coating 12. The thread-stitched web nonwoven carrier 10 consists of the fibres F which are overstitched by the regularly spaced stitching seams N.

Figure 2:
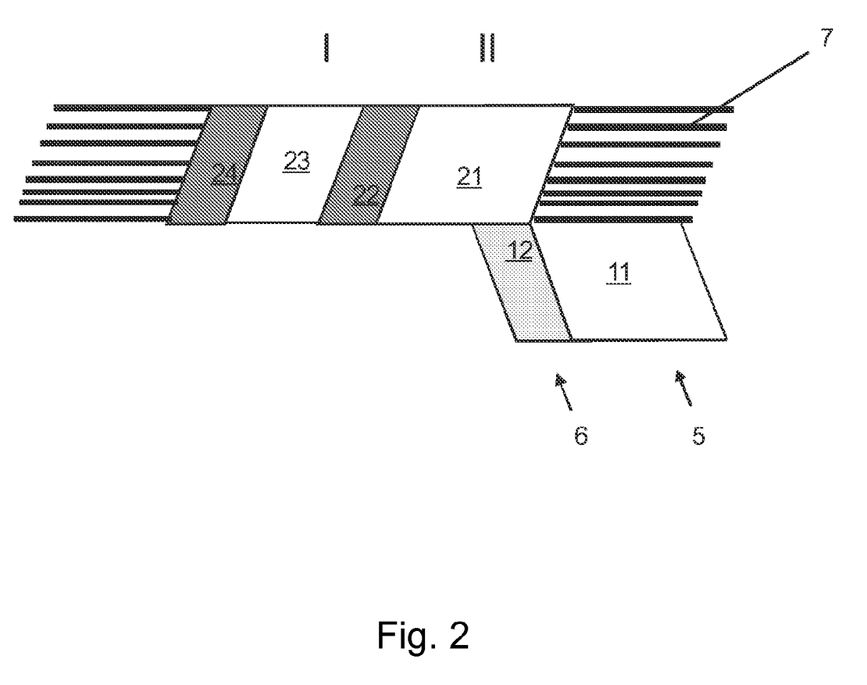
FIG. 2 shows a detail of a cable harness composed of a bundling of individual cables and jacketed with the adhesive tape of the present invention.

FIG. 2 shows a detail of a cable harness which is composed of a bundling of individual cables 7 and which is jacketed with the adhesive tape of the present invention. The adhesive tape is spiralled around the cable harness.

The cable harness detail shown shows two windings I and II of the adhesive tape. Further windings would extend towards the left; they are not depicted here.

A stripe 5 of the covering is present on the adhesive coating to produce an adhesive stripe 6 extending in the longitudinal direction of the tape. Non-adhesive regions 11, 21, 23 of the adhesive tape alternate with adhesive regions 12, 22, 24. (The portions 22, 24 are—unlike the exposed adhesive material 12—not visible from the outside, hence the choice of denser hatching for the depiction.)

The cable harness is jacketed such that the adhesive stripe 6 completely adheres on the adhesive tape. Adhering to the cables 7 is foreclosed.

We claim:

1. An adhesive tape consisting of a carrier and an adhesive layer applied to at least one side of the carrier, wherein the carrier is a final thread-stitched web nonwoven carrier produced from a base web of staple fibres that is preconsolidated, before overstitching with stitching threads, by needling to produce a preconsolidated base web, wherein mutually parallel stitching threads are stitched into the preconsolidated base web to form the final thread-stitched web nonwoven carrier, wherein the ultimate tensile strength of the preconsolidated, but not as yet overstitched, base web is less than 1 N/cm, wherein an angle made by at least 50% of the staple fibres relative to an axis extending in a transverse direction of the base web is between 5° and 45°.

2. The adhesive tape according to claim 1, wherein the ultimate tensile strength of the preconsolidated, but not as yet overstitched base web, is below 0.5 N/cm.

3. The adhesive tape according to claim 1, wherein the base web consists of polyester, polypropylene, polyethylene or polyamide fibres.

4. The adhesive tape according to claim 1, wherein the stitching threads consist of polyester, polypropylene, polyethylene or polyamide.

5. The adhesive tape according to claim 1, wherein the stitching threads form a parallel arrangement in the machine direction.

6. The adhesive tape according to claim 1, wherein the basis weight of the final thread-stitched web nonwoven carrier is between 30 g/m$^2$ and 180 g/m$^2$.

7. The adhesive tape according to claim 1, wherein a material of the base web is compacted by calendering.

8. The adhesive tape according to claim 1, wherein the needling is present in a range from 1 needle/cm$^2$ of the base web to 50 needles/cm$^2$ of the base web.

9. The adhesive tape according to claim 1, wherein the adhesive is based on natural rubber, synthetic rubber, acrylate or silicone.

10. The adhesive tape according to claim 1, wherein the adhesive comprises an acrylate pressure-sensitive hotmelt adhesive.

11. The adhesive tape according to claim 1, wherein the angle made by at least 50% of the staple fibres relative to the axis extending in the transverse direction of the web is between 15° and 30°.

12. The adhesive tape according to claim 1, wherein a proportion of staple fibres forming an angle between 5° and 45° relative to an axis extending in the cross direction of the web is above 80%.

13. The adhesive tape according to claim 12, wherein the proportion of staple fibres forming an angle between 5° and 45° relative to the axis extending in the cross direction of the web is above 95%.

14. The adhesive tape according to claim 1, wherein a number of overstitching threads is below 30 threads/25 mm width of carrier.

15. The adhesive tape according to claim 14, wherein a number of stitching threads is between 10 to 24 threads/25 mm width of the carrier.

16. The adhesive tape according to claim 1, wherein the adhesive is applied, in a form of at least one adhesive stripe, to the carrier in the longitudinal direction of the adhesive tape, wherein the at least one adhesive stripe has a width less than a width of the carrier.

17. The adhesive tape according to claim 16, wherein the width of the at least one adhesive stripe is 10 to 80% of the width of the carrier, and further wherein the at least one adhesive stripe is located at one edge of the carrier.

18. A method for jacketing elongate material, the method comprising:
passing the adhesive tape according to claim 1 around an elongate material in a helical line.

19. A method for jacketing elongate material, the method comprising:
enveloping an elongate material with the tape according to claim 1 in an axial direction.

20. A thread-stitched web nonwoven carrier produced from a base web of staple fibres that is preconsolidated, before overstitching with stitching threads, by needling to produce a preconsolidated base web, wherein mutually parallel stitching threads are stitched into the preconsolidated base web to form the thread-stitched web nonwoven carrier, wherein the ultimate tensile strength of the preconsolidated, but not as yet overstitched, base web is less than 1 N/cm, wherein an angle made by at least 50% of the staple fibres relative to an axis extending in a transverse direction of the base web is between 5° and 45°.

* * * * *